US005650180A

United States Patent [19]

Kumada et al.

[11] Patent Number: 5,650,180

[45] Date of Patent: Jul. 22, 1997

[54] DISPENSER FOR PASTE-TYPE MATERIAL

[75] Inventors: Takeo Kumada, Tsukui-Gun; Masahiro Furuya, Yokohama, both of Japan

[73] Assignee: Knorr Foods Co., Ltd., Kanagawa-Ken, Japan

[21] Appl. No.: 480,521

[22] Filed: Jun. 7, 1995

Related U.S. Application Data

[63] Continuation of Ser. No. 30,478, filed as filed as PCT/JP91/01019, Jul. 31, 1991, abandoned.

[51] Int. Cl.[6] .......................... B29C 47/12; B65D 35/30; B65D 35/56

[52] U.S. Cl. ........................ 425/376.1; 206/384; 222/95; 222/105; 222/465.1

[58] Field of Search .......................... 264/176.1; 425/87, 425/376.1; 206/277, 384; 222/1, 95, 105, 106, 465.1

[56] References Cited

U.S. PATENT DOCUMENTS

| | | | |
|---|---|---|---|
| 3,288,333 | 11/1966 | Valk, Jr. | 222/95 |
| 3,323,682 | 6/1967 | Creighton, Jr. et al. | 222/95 X |

FOREIGN PATENT DOCUMENTS

| | | | |
|---|---|---|---|
| 49-43355 | 4/1974 | Japan . | |
| 51-14179 | 4/1976 | Japan . | |
| 53-97831 | 8/1978 | Japan . | |
| 57-195475 | 12/1982 | Japan . | |
| 59-174474 | 10/1984 | Japan . | |
| 62-156378 | 10/1987 | Japan . | |
| 64-1270 | 1/1989 | Japan . | |
| 2-7667 | 2/1990 | Japan . | |
| 2-233169 | 9/1990 | Japan . | |
| 2-265669 | 10/1990 | Japan . | |
| 3-80959 | 4/1991 | Japan . | |
| 3-17967 | 4/1991 | Japan . | |
| 3-200576 | 9/1991 | Japan | 222/95 |

*Primary Examiner*—Leo B. Tentoni
*Attorney, Agent, or Firm*—Brumbaugh, Graves, Donohue & Raymond

[57] ABSTRACT

A dispenser for dispensing a paste-type material includes: a container charged with a paste-type material and provided at its one end with an extrusion tip, the container being collapsible in the longitudinal direction until the internal volume thereof is almost completely nullified; a cylindrical body opened at its both ends and having a diameter such that the container charged with the paste-type material is received in the cylindrical body; a piston sized to be insertable into the cylindrical body; and an extruder having a receiving portion for receiving the cylindrical body and having an operating portion. The operating portion is operable to cause a predetermined amount of advance of the piston into the cylindrical body received in the receiving portion so as to collapse the container in the longitudinal direction, thereby extruding a predetermined amount of the paste-type material from the extrusion tip of the container upon each operation of the operating portion.

6 Claims, 5 Drawing Sheets

DISPENSER FOR PASTE-TYPE MATERIAL

This is a continuation of application Ser. No. 08/030,478, filed as PCT/JP91/01019, Jul. 31, 1991, now abandoned.

TECHNICAL FIELD

The present invention relates to a dispenser for extruding a paste-type material and also to a method of extruding a paste-type material.

BACKGROUND ART

A dispenser has been conventionally used for the purpose of extruding a paste-type material such as a lubricating grease or edible material such as mayonnaise bit by bit at a constant rate. The known dispenser includes a comparatively rigid cylindrical body which is provided at its one end with an extrusion opening and opened at its other end, a floating piston insertable into the cylindrical body through the open end of the latter to fit rather tightly but movably in the cylindrical body, and an extruder having a receiving portion of a semi-circular cross-section for receiving the cylindrical body. The cylindrical body is charged with a paste-type material and is received in the receiving portion of the extruder. The extruder has an operating portion for plunging the piston into the cylindrical body received in the receiving portion. The piston is advanced a predetermined distance at each operation of the operating portion., so that a predetermined amount of the paste-type material is extruded in response to each plunging operation of the piston.

The described known dispenser inconveniently requires refilling of the cylindrical body each time the dispenser is used. In addition, the paste-type material tends to be contaminated during the filling of the cylindrical body, and this causes a serious problem particularly when the material is an edible one such as mayonnaise.

DISCLOSURE OF THE INVENTION

Accordingly, an object of the present invention is to provide a dispenser for a paste-type material, designed to enable the use of a disposable container.

Another object of the present invention is to provide a dispenser for a paste-type material, improved to eliminate any problem concerning health even when used for edible materials.

Still another object of the present invention is to provide a method of extruding a paste-type material, which can conveniently be used together with a disposable container.

A further object of the present invention is to provide a method of extruding a paste-type material, improved to eliminate any problem concerning health even when used for edible materials.

To these ends, according to one aspect of the present invention, there is provided a dispenser for a paste-type material, comprising: a container charged with a paste-type material and provided at its one end with an extrusion tip, the container being collapsible in the longitudinal direction until the internal volume thereof is almost completely nullified; a cylindrical body opened at its both ends and having such a diameter that the container charged with the paste-type material is received in the cylindrical body; a piston sized to be insertable into the cylindrical body; and an extruder having a receiving portion for receiving the cylindrical body and having also an operating portion, the operating portion being operable to cause a predetermined amount of advance of the piston into the cylindrical body received in said receiving portion so as to collapse the container in the longitudinal direction, thereby extruding a predetermined amount of the paste-type material from the extrusion tip of the container upon each operation of the operating portion.

According to another aspect of the present invention, there is provided a dispenser for a paste-type material, comprising: a container charged with a paste-type material and provided at its one end with an extrusion tip, the container being collapsible in the longitudinal direction until the internal volume thereof is almost completely nullified; and an extruder; wherein the extruder includes a cylindrical portion capable of receiving the container charged with the paste-type material, a container loading opening provided in the cylindrical portion which can be opened when desired, a piston sized to be insertable into the cylindrical portion, and an operating portion, the operating portion being operable to cause a predetermined amount of advance of the piston into the cylindrical portion so as to collapse the container in the cylindrical portion in the longitudinal direction, thereby extruding a predetermined amount of the paste-type material from the extrusion tip of the container upon each operation of the operating portion.

Preferably, the cylindrical body has an outer peripheral large-diameter portion, and the receiving portion of the extruder is provided on the inner peripheral surface at its one end thereof with an annular portion for contacting the large-diameter portion, the cylindrical body being axially slidable a predetermined distance in the receiving portion.

It is also preferred that a cylindrical hollow portion of a larger diameter than the piston is formed coaxially with the piston in the end of the receiving portion of the extruder adjacent to the extrusion tip of the container.

The invention also provides a container which is charged with a paste-type material and which is provided at its one end with an extrusion tip, the container being collapsible in the longitudinal direction until the internal volume is substantially nullified.

According to a further aspect of the present invention, there is provided a dispenser, comprising: a cylindrical body opened at its both ends; a piston sized to be insertable into the cylindrical body; and an extruder, wherein the extruder has a receiving portion for receiving the cylindrical body and has also an operating portion, the operating portion being operative to cause a predetermined amount of advance of the piston into the cylindrical body received ins aid receiving portion.

According to a further aspect of the present invention, there is provided a method of extruding a paste-type material, comprising the steps of: preparing a container charged with a paste-type material and having an extrusion tip on one end thereof, the container being collapsible in the longitudinal direction until the internal volume is substantially nullified; and placing the container in a cylindrical space and collapsing the container from the end of the container opposite to the extrusion tip; whereby the paste-type material is extruded from the container through the extrusion tip.

According to the above-described features of the present invention, the container charged with a paste-type material is placed in a cylindrical body opened at its both ends or in a cylindrical portion of the extruder, and is collapsed in the longitudinal direction by the action of the piston which is advanced bit by bit a predetermined distance by the operation of the extruder. As a result of the collapse of the container, the paste-type material is extruded through the extrusion at a fixed rate in response to each operation. During the collapsing of the container, no lateral buckling of the container takes place because the container is received in the cylindrical body or in the cylindrical portion of the extruder, so that the container is collapsed in the longitudinal direction without fail.

EMBODIMENTS

Figure 1:
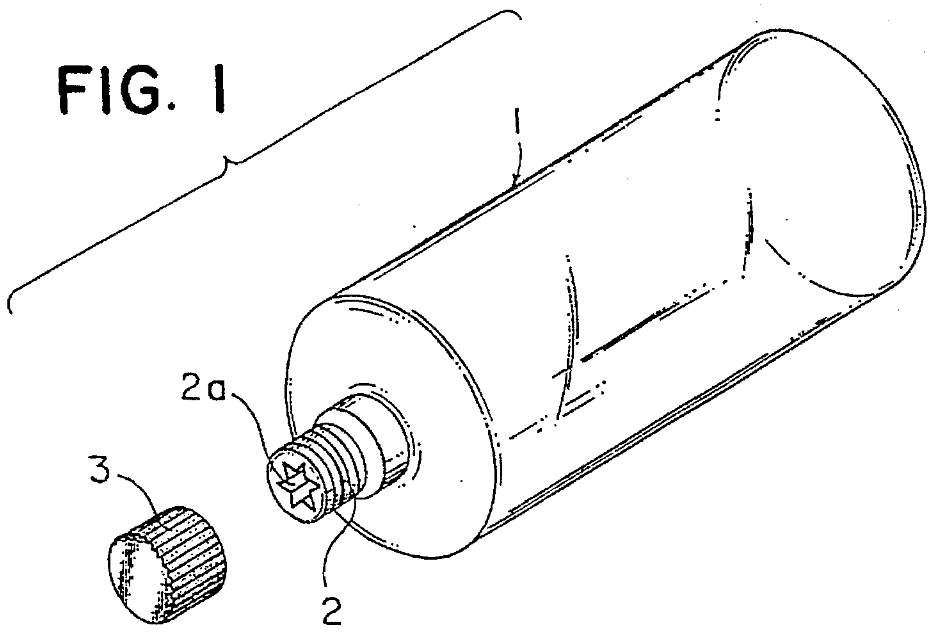
FIG. 1 is a perspective view of an embodiment of the container of the present invention charged with a paste-type material.

Embodiments of the present invention will be described with reference to the accompanying drawings. FIG. 1 shows an embodiment of a container employed in the present invention and used for containing a paste-type material therein. The container 1 is formed into a cylindrical form from a suitable plastics by using a blow molding technique, and is closed at its one end while the other end is provided with an extrusion tip 2. The extrusion tip 2 has an opening **2*a* of a suitable configuration. A cap 3 is attached to the extrusion tip 2 by, for example, screwing. It is possible to replace the cap 3 with a sheet material such as an aluminum foil which is attached to the tip 2 by, for example, heat seal so as to seal the opening 2*a*. The container 1 should provide a barrier against ambient moisture when it is used for a food such as mayonnaise. The container 1 is thin-walled and is collapsible in the longitudinal direction thereof until the internal volume is reduced substantially to zero. Conventional plastic containers used for mayonnaise or the like material are collapsible in the lateral direction but could not be collapsed in the longitudinal direction without causing lateral buckling, because the walls of these known containers have comparatively high level of rigidity. In contrast, the container 1** used in the invention, which has a sufficiently small wall thickness, can be collapsed in the longitudinal direction when compressed from one towards the other longitudinal end.

Figure 2:
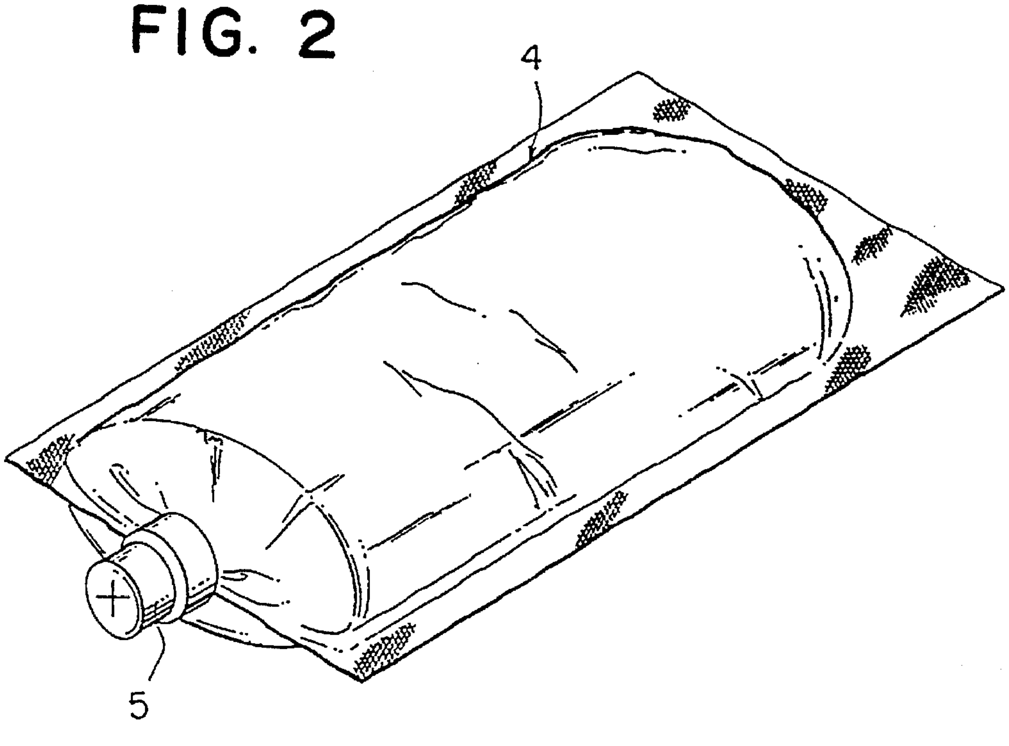
FIG. 2 is a perspective view of another embodiment of the container.

FIG. 2 shows another type of container. This container 4 is formed by superposing plastics films and heat-sealing these films at their peripheral edges, such that an extrusion opening 5 is formed at one longitudinal end thereof. This container 4 also exhibits a very low level of rigidity so that it is collapsible in the longitudinal direction until the internal volume is reduced substantially to zero.

Figure 3:
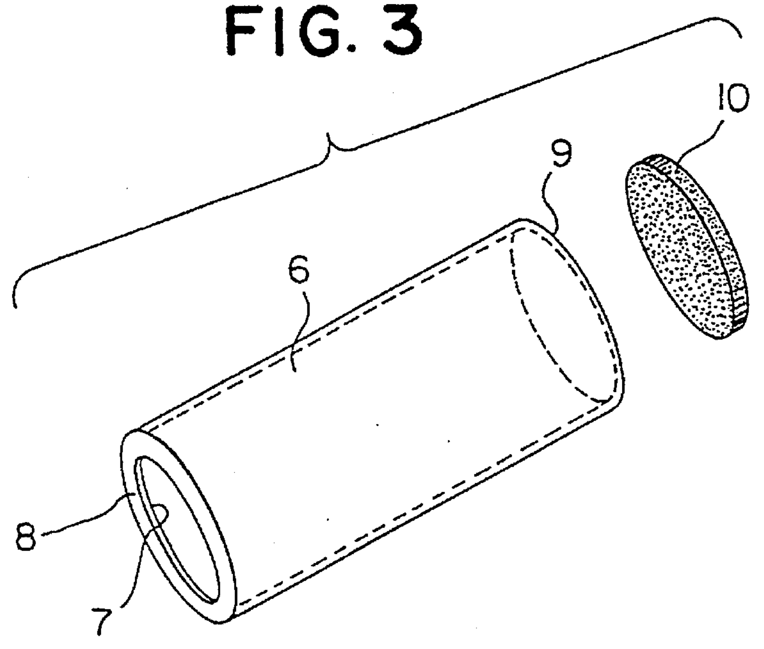
FIG. 3 is a perspective view of a cylindrical body and a piston.

FIG. 3 illustrates a cylindrical body and a piston which are used in the present invention. The cylindrical body 6 is an article molded from plastics and has a cylindrical form with a substantial level of rigidity. An annular flange 8 having an opening 7 is formed in one end of the cylindrical body 6. The other end 9 of the cylindrical body 6 is opened. The piston 10 has such a diameter as to enable the piston 10 to be loosely received in the cylindrical body 6 for an easy axial movement therein.

Contrarily to the arrangement shown in FIG. 3, the cylindrical body 6 may be opened at its one end while the other end is provided with an annular flange having an opening.

Figure 4:
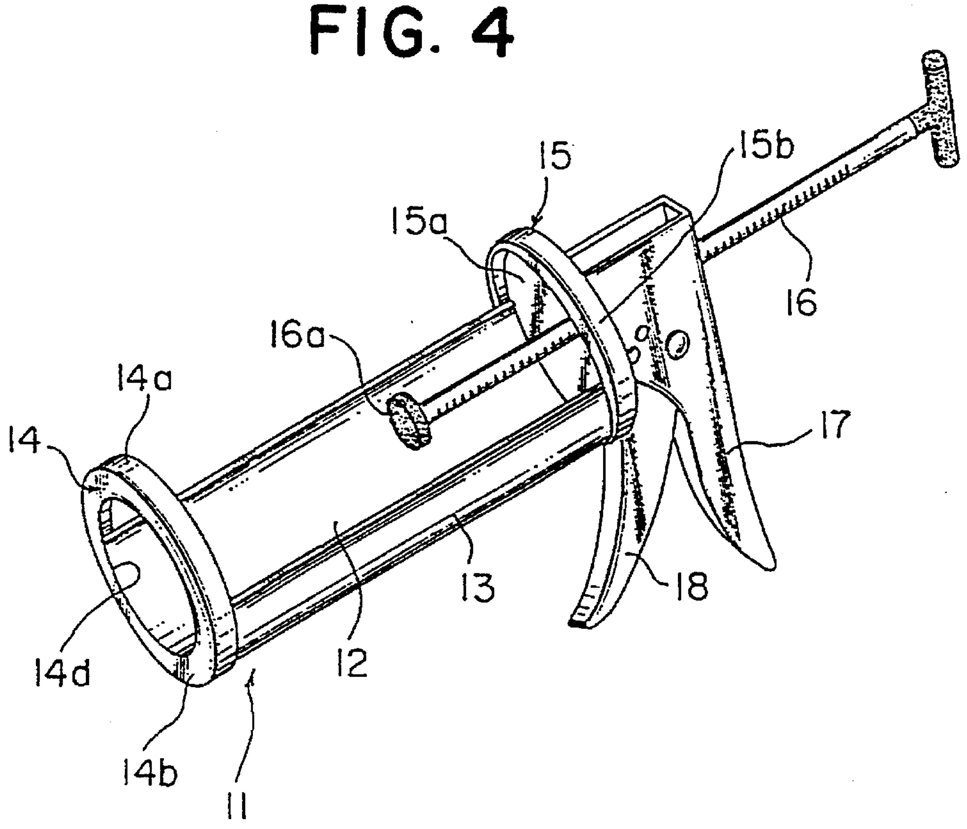
FIG. 4 is a perspective view of an embodiment of an extruder.

FIG. 4 illustrates an embodiment of the extruder. The extruder 11 has a main part 13 having a semi-circular cross-section and providing a receiving portion 12, and end plates 14, 15 which are provided on both ends of the main part 13. The end plate 14 is composed of a cylindrical portion **14*a* and an annular flange portion 14*b*. The cylindrical portion 14*a* is connected to one end of the main part 13. The annular flange 14*b* defines an opening 14*d* at its inner peripheral edge. The end plate 15 has a disk portion 15*a* and a peripheral cylindrical portion 15*b*. The cylindrical portion 15*b* is connected to the other end of the main part 13**.

A plunger rod 16 is disposed so as to extend through a bore formed in the disk portion **15*a* of the end plate 15. A disk-shaped plunger plate 16*a* of a small diameter is fixed to the end of the plunger rod 16 inside the receiving portion 12, while a stationary handle 17 is secured to the portion of the disk portion 15*a* of the end plate 15 outside the receiving portion 12. A movable handle 18 is attached to the stationary handle 17. The movable handle 18 is provided with a detent (not shown) which engages with a teeth or grooves formed in the outer surface of the plunger rod 16 so that the plunger rod 16 is advanced a predetermined distance to the left as viewed in FIG. 4 in response to each operation of the movable handle 18**.

The cylindrical body 6 has a diameter which is determined such that the cylindrical body 6 just fits in the receiving portion 12 of the extruder 11. In the practical use, the container 1 or 4 shown in FIGS. 1 or 2 is charged with a paste-type material, and is placed in the cylindrical body 6, such that the extrusion tip 2 or 5 of the container 1 or 4 is located on the same side as the opening 7 of the cylindrical body 6 and is projected slightly from the opening 7. Then, with the piston 10 inserted from the other end 9, the cylindrical body 6 is received in the receiving portion 12 of the extruder 11, such that the extrusion tip 2 or 5 of the container 1 or 4 projects beyond the opening **14*d* of the end plate 14 of the extruder 11**.

When the movable handle 18 is operated with the plunger plate **16*a* of the pusher rod 16 engaging with the piston 10, the plunger rod 16 is advanced a predetermined distance so as to plunge the piston 10 into the cylinder 6** a predetermined distance.

In this state, the container 1 or 4 is constrained by the cylindrical member 6 so that it is collapsed in the longitudinal direction without any lateral buckling, whereby a predetermined amount of the paste-type material is extruded. The container 1 or 4 is collapsible in the longitudinal direction until the internal volume is substantially nullified, by the repeated operation of the movable handle 18, whereby the paste-type material in the container is extruded substantially completely. The container after the use can be disposed, and a new container filled with the paste-type material is used in place of the disposed container.

In the described embodiment, the piston 10 and the plunger rod 16 are provided as separate parts. It is to be understood, however, that the plunger plate **16*a* can be used as the piston, provided that the plunger plate 16*a* has a sufficiently large diameter. In such a case, the piston 10** can be omitted.

Figure 5:
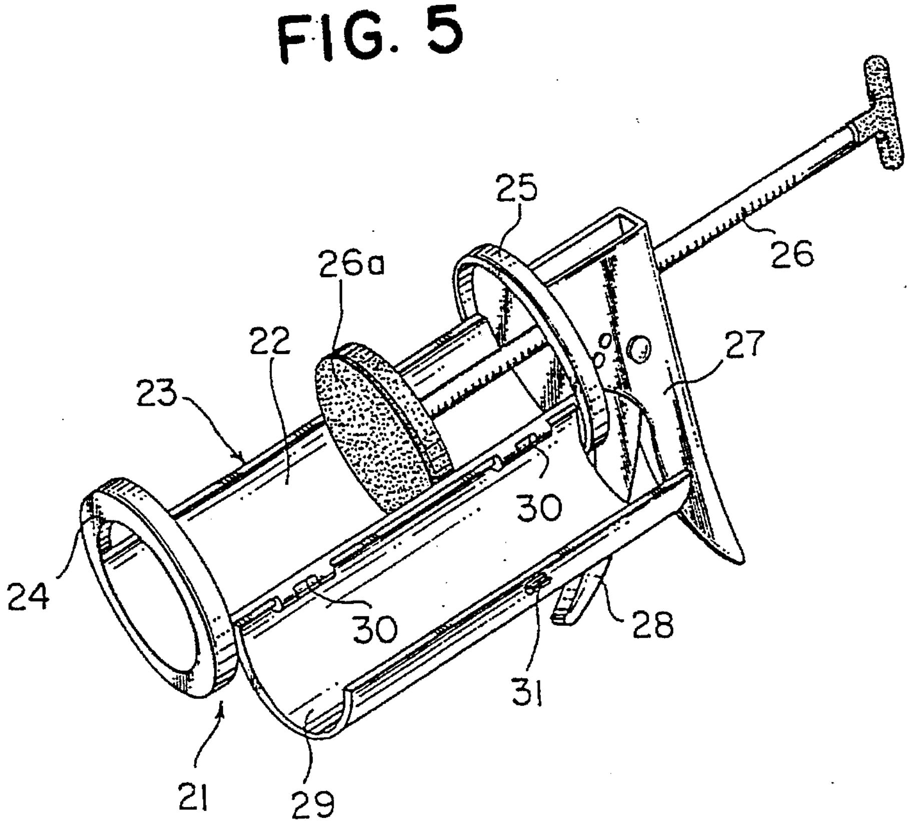
FIGS. 5 and 6 are perspective views of other embodiments of the extruder, respectively.

FIG. 5 shows another embodiment of the extruder used in the present invention. The extruder 21 has a main part 23 of a semi-circular cross-section similar to the main part 13 of the previously described extruder 11. End plates 24,25 similar to the end plates 14, 15 are attached to both ends of the main part 23. The extruder also has a plunger rod 26, a stationary handle 27 and a movable handle 28 which are similar to those of the preceding embodiment. A piston 26*a* is provided on the end of the plunger rod 26. This embodiment features a lid 29 of a semi-circular cross-section. The lid 29 forms, together with the main part 23, a receiving portion 22 of a semi-circular cross-section. The lid 29 is hinged at its one longitudinal edge to one longitudinal edge of the main part by means of a hinge 30, so as to be swingable between open and close positions. The other edge of the lid 29 is provided with a fixing member 31.

In this embodiment of the extruder 21, the container 1 or 4 charged with the paste-type material is received in the receiving portion 22 through an loading opening which is formed when the lid 29 is moved to the open position. By operating the handle 28 after closing the lid 29, the container 1 or 4 can be collapsed in the longitudinal direction.

Figure 6:
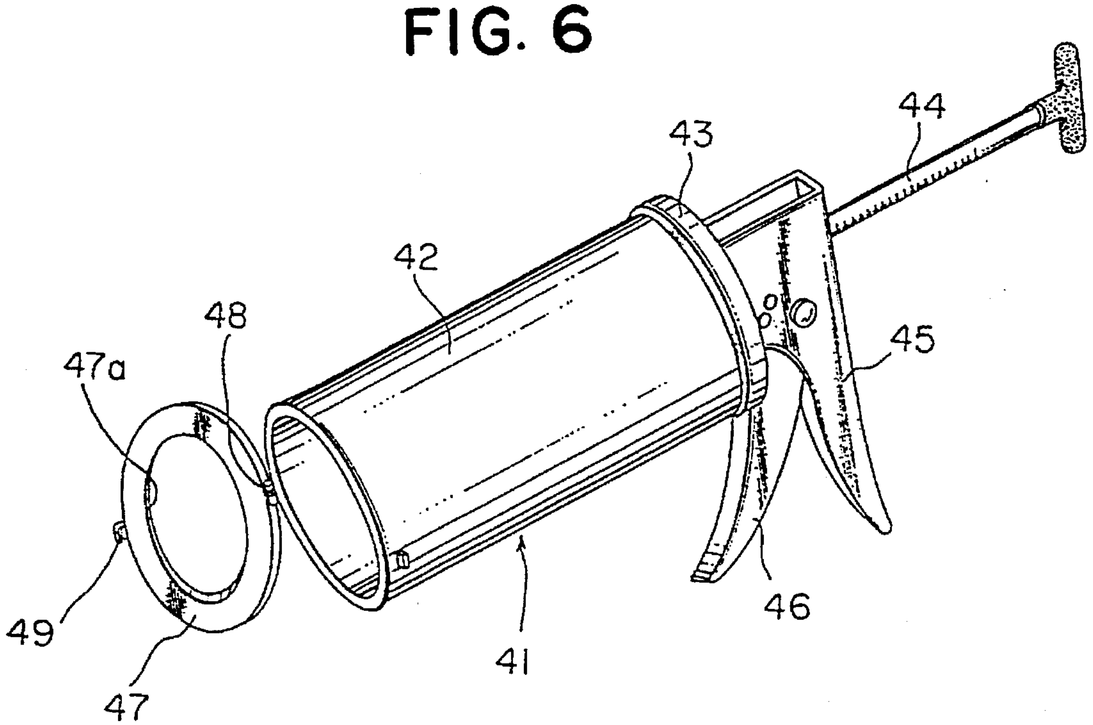

FIG. 6 illustrates still another embodiment of the extruder used in the present invention. This extruder 41 has a cylindrical main part 42 to one end of which is secured an end plate 43. The extruder has a plunger rod 44, stationary handle 45 and a movable handle 46 which are arranged and constructed in the same manners as those in the preceding embodiments. A piston (not shown) similar to the piston 26*a* of the preceding embodiment is fixed to the end of the plunger rod 44.

A ring-shaped lid 47 is attached to the end of the cylindrical main part 42 by means of a hinge 48 for movement between open and close positions. The lid 47 is provided with a central opening 47*a*. The lid 47 can be fixed to the main part 42 in the closing position by means of a fixing member 49. In this embodiment, the container 1 or 4 charged with the paste-type material is inserted into the cylindrical main part 42 from the end of the latter after the lid 47 is swung to the open position. Then, the lid 47 is closed, followed by the same operation as that described before.

Figure 7:
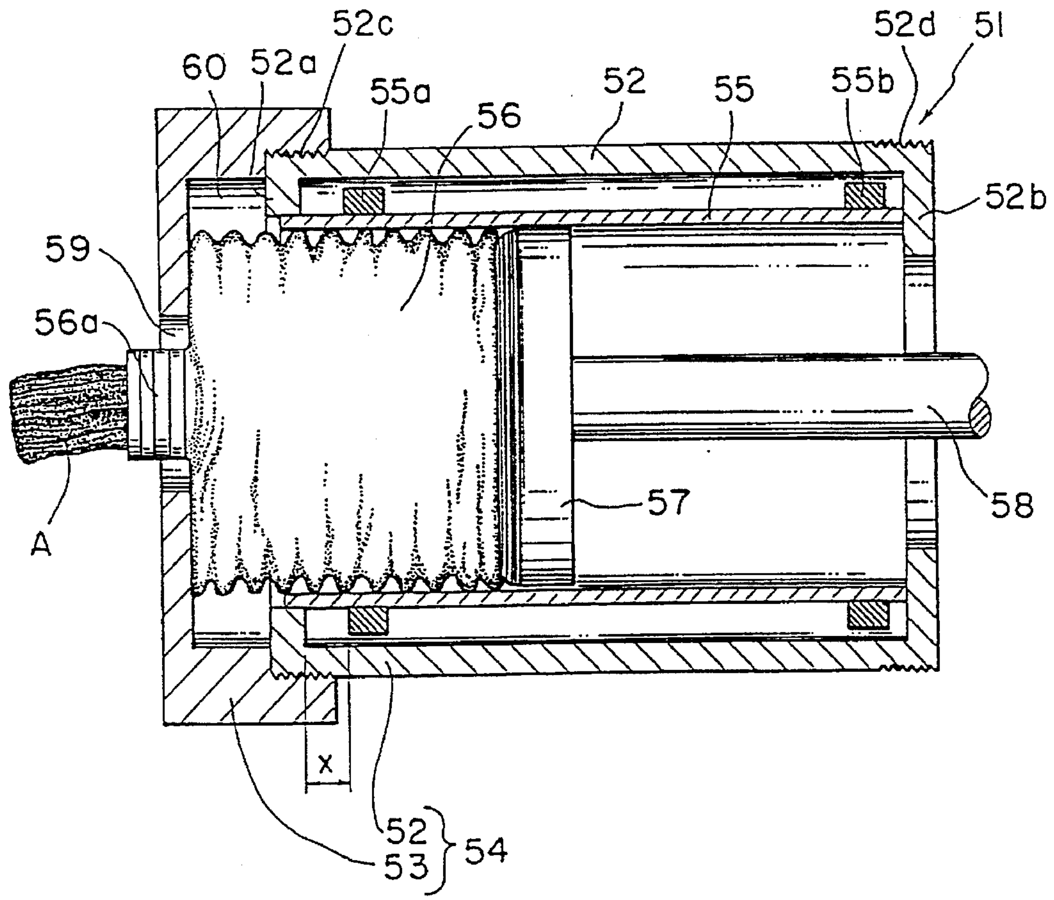
FIG. 7 is a sectional view of an extruder of another embodiment.

FIG. 7 shows another embodiment of the extruder used in the present invention. The extruder 51 has a receiving portion 54 which includes a main part 52 and a lid 53 which is in screwing engagement with one end of the main part 52 by means of screw thread 52*c*, and further has a cylindrical body 55 which receives a container 56 charged with a paste-type material A. A piston 57 contacts with the bottom of the container 56. The plunger rod 58 plunges the piston 57 which in turn collapses the container 56, whereby the paste-type material A is extruded from the extrusion tip 56*a*. Although not shown, this example also has a stationary handle and a movable handle which are constructed and arranged in the same ways as the preceding embodiments. An opening 59 is formed in the center of the lid 53 which partly forms the receiving portion 54, and the extrusion tip 56*a* of the container 56 projects from the opening 59. The other end of the main part 52, opposite to the end having the screw thread 52*c*, is also threaded as at 52*d*, and an operating portion including a stationary handle and a movable handle is connected to this threaded end 52*d*.

The cylindrical body 55 has outer peripheral large-diameter portions 55*a*, 55*b*. The large-diameter portion 55*a* is positioned at a certain distance from the end of the cylindrical body 55. An annular portion 52*a* for contacting the larger diameter portion 55*a* is provided on the inner periphery of the main part 52 at one end of the latter. An annular portion 52*b* formed in the other end of the main part 52 prevents the cylindrical body 55 form coming off the main part 52. According to this arrangement, the cylindrical body 55 is movable a distance X within the main part 52. The main part 52 is split into two parts. These two parts are joined together after the cylindrical body 55 is placed in the main part 52.

A cylindrical hollow portion 60 having a diameter greater than that of the piston 57 is formed coaxially with the piston 57, in the lid 53 which is in screwing engagement with the main part 52.

When the piston 57 is stopped after being plunged to extrude the predetermined amount of the paste-type material A from the extrusion tip 56*a*, a drag of the paste-type material may occur due to its viscosity, without completely terminating the extrusion. Such a drag of small amount of the paste-type material can be avoided when the piston 57 which has been plunged a predetermined distance to collapse the container 56 is retracted a slight distance so that the collapsed container 56 recovers the portion of the internal volume corresponding to the distance of retraction, whereby the paste-type material A extruded from the extrusion tip 56*a* is sucked back into the container 56, thus avoiding a dragging of a small amount of the paste-type material A. In this embodiment, therefore, the operating portion of the extruder is so constructed that the piston 57 is slightly retracted backward after being plunged forward by the predetermined distance. In addition, the cylindrical body 55 is slidable in the main part 52. With this arrangement, since the container 56 and the cylindrical body 55 frictionally engage with each other to move as a unit with each other, the cylindrical body 55, as well as the container 56, is moved back and forth in accordance with the forward and backward movement of the piston 57, whereby a desired amount of the paste-type material A can be extruded without fail, thus avoiding dragging of a small quantity of the paste-type material.

When the container 56 has been fully collapsed to reach the end of the lid 53, the piston 57 may become immovable due to the possible jamming of the bottom of the collapsed container 56 between the piston 57 and the cylindrical body 55. This problem, however, can be overcome in this embodiment which has the cylindrical hollow portion 60, because the bottom of the container 56, even after the container 56 has been fully collapsed, is relieved into the cylindrical hollow portion 60, without jamming between the piston 57 and the inner peripheral surface of the cylindrical body 55.

It is not always necessary that two large-diameter portions 55*a*, 55*b* are provided. Namely, only one large-diameter portion 55*a* is enough to allow the sliding movement of the cylindrical body 55. Provision of the large-diameter portion 55*b* in addition to the large-diameter portion 55*a* makes it possible to maintain the cylindrical body 55 in the main part 52 substantially coaxially with the latter, which is preferable to enable the movement of the piston 57 back and forth.

Figure 8A:
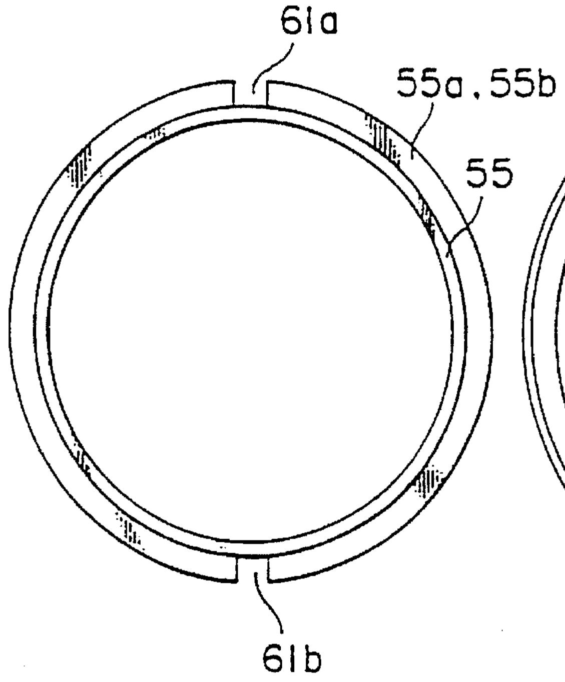
FIGS. 8*a* and 8*b* are views of a cylindrical body and a main part as viewed in the axial direction, respectively.
Figure 8B:
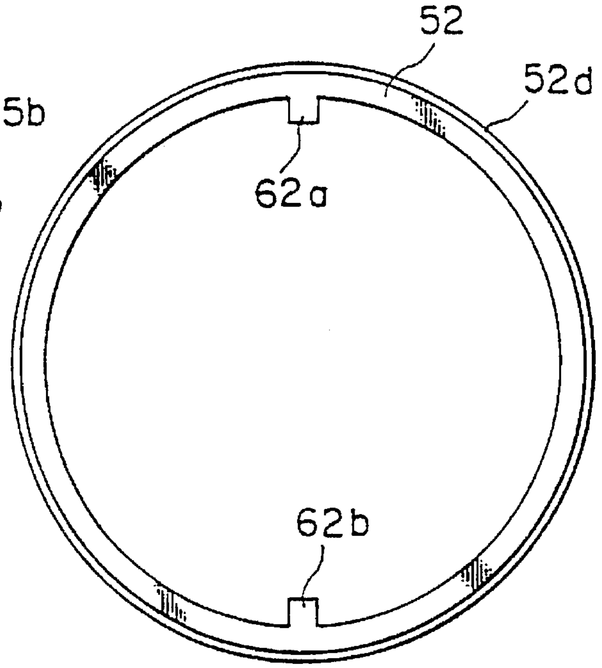

As shown in FIG. 8*a*, each of the large-diameter portions 55*a*, 55*b* formed on the outer periphery of the cylindrical body 55 has a pair of diametrically opposing notches 61*a* and 61*b*, while a pair of diametrically opposing projections 62*a* and 62*b* are formed on the inner peripheral surface of the main part 52 as shown in FIG. 8*b*, so as to be cleared by the above-mentioned notches 61*a*, 61*b*. According to the described construction of the large-diameter portions 55*a*, 55*b* and the main part 52, the cylindrical body 55 is inserted into the main part 52 with the projections 62*a*, 62*b* aligned with the notches 61*a*, 61*b*. Then, the cylindrical body 55 is slightly rotated so that the cylindrical body is prevented from coming off the main part 52. The cylindrical body 55 can be disengaged from the main part 52 if necessary.

As has been described, according to the present invention, a container charged with a paste-type material and collapsible in the longitudinal direction is placed in a cylindrical body or in a cylindrical receiving portion, and is collapsed in the longitudinal direction by an extruder while a lateral buckling of the container is prevented, thus extruding the material from the container. The container after the use can be disposed. Thus, the dispenser of the present invention can be used conveniently, and is free from the problem of insanitation which has been encountered with conventional dispensers due to the necessity of refilling.

We claim:

1. A dispenser for a paste-type material, comprising:

a container having an internal volume charged with a paste-type material and having an end with an extrusion tip, the container being collapsible in a longitudinal direction until the internal volume of the container is almost nullified;

a cylindrical body open at its both ends and having a diameter sufficient for receiving the container, an exterior surface portion of the container and an interior surface portion of the cylindrical body being in mutual frictional engagement; and an extruder having (1) a receiving portion for receiving the cylindrical body, an exterior surface portion of the cylindrical body and an interior surface portion of the receiving portion being in axially slidable engagement; and (2) an operating portion comprising (a) a piston which is sized to be insertable into the cylindrical body, and (b) an operating means for causing (i) a predetermined amount of advance of the piston into the cylindrical body received in the receiving portion, so as to collapse the container in the longitudinal direction, thereby extruding a predetermined amount of the paste-type material from the extrusion tip, and (ii) a predetermined amount of pullback of the piston after its advance; whereby the cylindrical body is axially slidable in the receiving portion by frictional entrainment of the cylindrical body by the container, in accordance with the advance and pullback of the piston, and a residual portion of the predetermined amount of the paste-type material extruded in the advance of the piston is pulled back into the container upon the pullback of the piston after the advance.

2. The dispenser for a paste-type material according to claim 1, wherein the cylindrical body is provided with a larger-diameter outer peripheral portion on an outer peripheral surface of the cylindrical body, and wherein the receiving portion of the extruder is provided with an annular portion on one end of an inner peripheral surface of the receiving portion of the extruder, contacting the larger-diameter outer peripheral portion.

3. A dispenser for a paste-type material according to claim 1, wherein a cylindrical hollow portion having a diameter larger than the diameter of the piston is disposed coaxially with the piston, at an end of the receiving portion of the extruder adjacent to the extrusion tip of the container.

4. A dispenser, comprising:

a cylindrical body open at its both ends and having a diameter sufficient for receiving a container which has an end with an extrusion tip and which is charged with a paste-type material, for an exterior surface portion of the container and an interior surface portion of the cylindrical body to be in mutual frictional engagement; and an extruder having (1) a receiving portion for receiving the cylindrical body, an exterior surface portion of the cylindrical body and an interior surface portion of the receiving portion being in axially slidable engagement; and (2) an operating portion comprising (a) a piston which is sized to be insertable into the cylindrical body, and (b) an operating means for causing (i) a predetermined amount of advance of the piston into the cylindrical body received in the receiving portion, so as to collapse the container in the longitudinal direction, thereby extruding a predetermined amount of the paste-type material from the extrusion tip, and (ii) a predetermined amount of pullback of the piston after its advance; whereby the cylindrical body is axially slidable in the receiving portion by frictional entrainment of the cylindrical body by the container, in accordance with the advance and pullback of the piston, and a residual portion of the predetermined amount of the paste-type material extruded in the advance of the piston is pulled back into the container upon the pullback of the piston after the advance.

5. A dispenser according to claim 4, wherein the cylindrical body is provided with a larger-diameter outer peripheral portion on an outer peripheral surface of the cylindrical body, and wherein the receiving portion of the extruder is provided with an annular portion on one end of an inner peripheral surface of the receiving portion of the extruder, contacting the larger-diameter outer peripheral portion.

6. A dispenser according to claim 4, wherein a cylindrical hollow portion having a diameter larger than the diameter of the piston is disposed coaxially with the piston, at an end of the receiving portion of the extruder adjacent to the extrusion tip of the container.

* * * * *